(12) United States Patent
Shiraishi et al.

(10) Patent No.: US 9,127,627 B2
(45) Date of Patent: Sep. 8, 2015

(54) INTAKE DEVICE OF A VERTICAL MULTICYLINDER ENGINE

(71) Applicant: KUBOTA Corporation, Osaka-shi, Osaka (JP)

(72) Inventors: Kentaro Shiraishi, Sakai (JP); Shinji Kishi, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/967,476

(22) Filed: Aug. 15, 2013

(65) Prior Publication Data

US 2014/0069365 A1 Mar. 13, 2014

(30) Foreign Application Priority Data

Sep. 10, 2012 (JP) ................. 2012-198285

(51) Int. Cl.
| | |
|---|---|
| *F02M 35/10* | (2006.01) |
| *F02M 25/06* | (2006.01) |
| *F01M 13/00* | (2006.01) |
| *F01M 13/02* | (2006.01) |

(52) U.S. Cl.
CPC ............... *F02M 35/10* (2013.01); *F01M 13/00* (2013.01); *F01M 13/022* (2013.01); *F02M 25/06* (2013.01)

(58) Field of Classification Search
CPC .................... F02M 25/0722; F02M 35/10354; F02M 35/10; F02M 35/10222; F02M 21/047; F02M 21/0239; F02M 35/10229
USPC ............. 123/184.28, 184.24, 184.27, 184.21, 123/184.45, 41.86, 572–574
See application file for complete search history.

(56) References Cited

U.S. PATENT DOCUMENTS

| | | | | |
|---|---|---|---|---|
| 3,589,347 | A | * | 6/1971 | Sawada .......................... 123/574 |
| 4,502,435 | A | * | 3/1985 | Tadokoro et al. ........... 123/198 F |
| 4,624,228 | A | * | 11/1986 | Sahara et al. .................. 123/378 |

(Continued)

FOREIGN PATENT DOCUMENTS

| | | |
|---|---|---|
| JP | H08-319813 A | 12/1996 |
| JP | H09-222052 A | 8/1997 |

(Continued)

OTHER PUBLICATIONS

Office Action issued Jun. 9, 2015 in JP Appln. No. 2012-198285.

(Continued)

*Primary Examiner* — Lindsay Low
*Assistant Examiner* — Long T Tran
(74) *Attorney, Agent, or Firm* — Panitch Schwarze Belisario & Nadel LLP

(57) ABSTRACT

An intake device of a multicylinder engine includes an intake manifold having a collector portion extending in a front-rear direction, an intake air introducing portion disposed at a center in the front-rear direction of the collector portion, and branch portions led out from front and rear end portions and of the collector portion. The branch portions are connected to an intake port of a cylinder head. A throttle body is disposed at an upper portion of the intake air introducing portion, and has a butterfly-type throttle valve, a valve shaft of which is oriented in the front-rear direction. A blow-by gas inlet portion is provided to the intake air introducing portion 4 of the intake manifold, and is disposed on a side to which a lower end portion of the half-open throttle valve is directed and on a downstream side of the lower end portion.

4 Claims, 1 Drawing Sheet

(56) References Cited

U.S. PATENT DOCUMENTS

| | | | |
|---|---|---|---|
| 4,674,457 A | 6/1987 | Berger et al. | |
| 5,850,823 A * | 12/1998 | Kasahara | 123/572 |
| 6,390,080 B1 | 5/2002 | Dowding et al. | |
| 6,604,506 B2 * | 8/2003 | Tanaka et al. | 123/336 |
| 6,679,228 B1 | 1/2004 | Confer et al. | |
| 6,789,524 B2 * | 9/2004 | Ino et al. | 123/337 |
| 7,243,642 B2 * | 7/2007 | Nishikawa et al. | 123/572 |
| 7,637,244 B2 * | 12/2009 | Akazaki et al. | 123/337 |
| 8,511,289 B2 * | 8/2013 | Tanikawa et al. | 123/568.17 |
| 2002/0185100 A1 * | 12/2002 | Matsumoto et al. | 123/184.21 |
| 2006/0236984 A1 | 10/2006 | Reddy | |
| 2009/0126670 A1 | 5/2009 | Kado et al. | |
| 2011/0146612 A1 * | 6/2011 | Kusuda et al. | 123/184.53 |
| 2011/0315131 A1 | 12/2011 | Lohr et al. | |
| 2012/0279481 A1 | 11/2012 | Okada | |
| 2013/0118433 A1 * | 5/2013 | Tochizawa | 123/184.21 |

FOREIGN PATENT DOCUMENTS

| | | |
|---|---|---|
| JP | H11-247727 A | 9/1999 |
| JP | 2000-045880 A | 2/2000 |
| JP | 2000-080963 A | 3/2000 |
| JP | 2003-090206 A | 3/2003 |
| JP | 2008-298056 A | 12/2008 |
| WO | 2011099127 A1 | 8/2011 |

OTHER PUBLICATIONS

Extended European Search Report issued May 19, 2015 in EP Application No. 13250093.5.

* cited by examiner

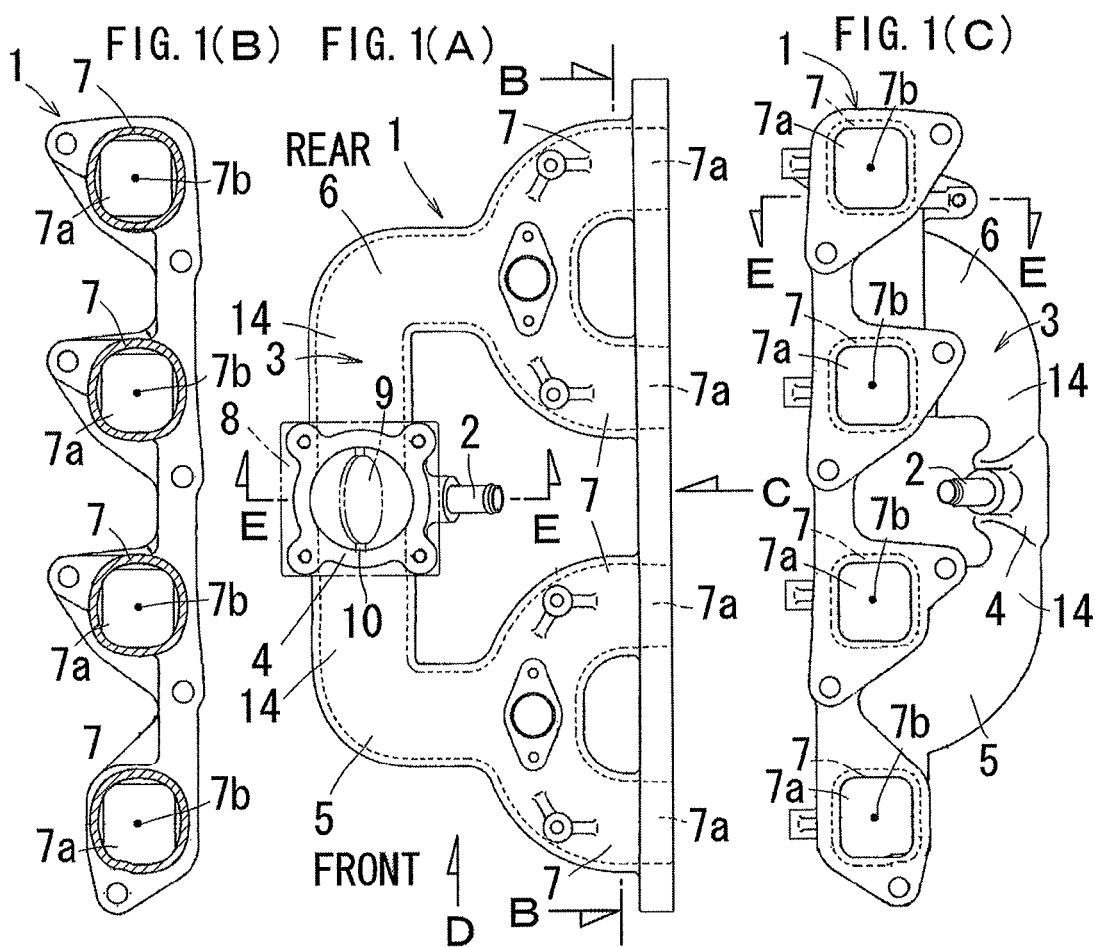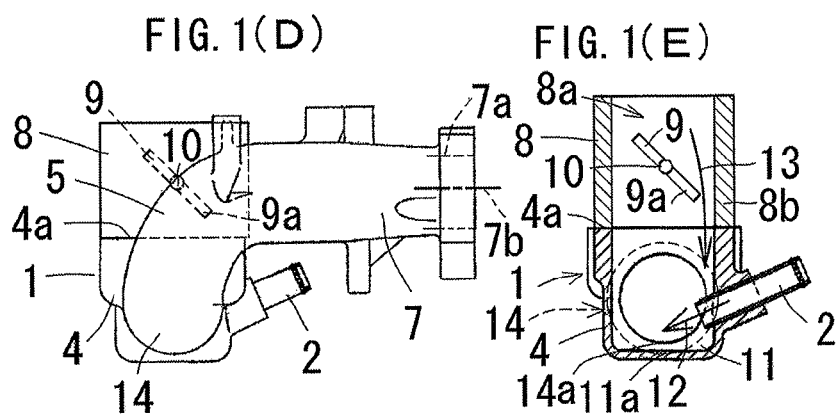

INTAKE DEVICE OF A VERTICAL MULTICYLINDER ENGINE

BACKGROUND OF THE INVENTION

The present invention relates to an intake device of a multicylinder engine and specifically to an intake device of a multicylinder engine in which equalization of distribution of blow-by gas into respective cylinders can be facilitated.

Conventionally, there is an intake device of a multicylinder engine including an intake manifold and a blow-by gas inlet provided to the intake manifold (see FIGS. 5 and 7 in Japanese Patent Application Laid-Open No. 2003-90206, for example).

The intake device of this type has an advantage that environmental pollution can be suppressed by returning blow-by gas to intake air and burning it again.

However, the related art has a problem, because it has no device for facilitating diffusion of the blow-by gas into the intake air.

Distribution of the blow-by gas into the respective cylinders is unequal.

Because there is no device for facilitating the diffusion of the blow-by gas into the intake air, distribution of the blow-by gas into the respective cylinders become unequal, which reduces output and exhaust performance.

BRIEF SUMMARY OF THE INVENTION

It is an object of the present invention to provide an intake device of a multicylinder engine in which equalization of distribution of blow-by gas into respective cylinders can be facilitated.

A matter defining the invention according to claim 1 is as follows.

As shown as an example in FIGS. 1A, 1C, 1D, and 1E, in an intake device of a multicylinder engine, the device including an intake manifold (1) and a blow-by gas inlet portion (2) provided to the intake manifold (1), as shown as an example in FIGS. 1A and 1C, the intake manifold (1) includes a collector portion (3) extending in a front-rear direction, an intake air introducing portion (4) disposed at a center in the front-rear direction of the collector portion (3), and branch portions (7), (7) led out from front and rear end portions (5) and (6) of the collector portion (3), and the branch portions (7) are connected to intake ports of a cylinder head, as shown as an example in FIGS. 1A, 1D, and 1E, a throttle body (8) is disposed at an upper portion of the intake air introducing portion (4), the throttle body (8) has a butterfly-type throttle valve (9), and a valve shaft (10) of the throttle valve (9) is oriented in the front-rear direction, and as shown as an example in FIG. 1E, the blow-by gas inlet portion (2) is provided to the intake air introducing portion (4) of the intake manifold (1), and the blow-by gas inlet portion (2) is disposed on a side to which a lower end portion (9a) of the half-open throttle valve (9) is directed and on a downstream side of the lower end portion (9a) of the throttle valve (9).

It is possible to facilitate equalization of distribution of blow-by gas to the respective cylinders.

As shown as an example in FIG. 1E, the blow-by gas inlet portion (2) is provided to the intake air introducing portion (4) of the intake manifold (1) and the blow-by gas inlet portion (2) is disposed on the side to which the lower end portion (9a) of the half-open throttle valve (9) is directed and on the downstream side of the lower end portion (9a) of the throttle valve (9). Therefore, blow-by gas (12) flowing from the blow-by gas inlet portion (2) into the intake air introducing portion (4) gets caught in a high-speed downward intake air flow (13) throttled and guided by the throttle valve (9). As a result, diffusion of the blow-by gas (12) into the intake air is facilitated and equalization of the distribution of the blow-by gas (12) into the respective cylinders can be facilitated.

It is possible to facilitate equalization of distribution of oil mist included in the blow-by gas into the respective cylinders.

As shown as an example in FIG. 1E, the intake air introducing portion (4) has an oil reservoir (11) at an inner bottom and the blow-by gas inlet portion (2) is directed toward the oil reservoir (11). Therefore, even if the oil mist included in the blow-by gas (12) is condensed in the intake air introducing portion (4), the oil accumulates in the oil reservoir (11) and is turned into mist again by the high-speed downward intake air flow (13) throttled and guided by the throttle valve (9), and diffusion of the oil mist into the intake air is facilitated. As a result, it is possible to facilitate the equalization of the distribution of the oil mist included in the blow-by gas (12) into the respective cylinders.

A function of equalizing the distribution of the oil mist into the respective cylinders is high.

As shown as an example in FIGS. 1C and 1D, the front and rear end portions (5) and (6) of the collector portion (3) are led out upward. Therefore, even if the oil overflows from the oil reservoir (11), the oil does not freely flow down into the branch portions (7) and intake ports in a cylinder head and is turned into mist again by the intake air flow in the collector portion (3). Therefore, the function of equalizing the distribution of the oil mist into the respective cylinders is high.

It is possible to suppress increase in overall engine height.

As shown as an example in FIG. 1D, an upper face (4a) of the intake air introducing portion (4) is formed at a lower position than central axes (7b) of outlet openings (7a) of the branch portions (7) and the throttle body (8) is mounted to the upper face (4a) of the intake air introducing portion (4). Therefore, the throttle body (8) can be disposed at the low position, which suppresses the increase in the overall height of the engine.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1A to 1E are drawings for explaining an intake device of a multicylinder engine according to an embodiment of the present invention, wherein FIG. 1A is a plan view, FIG. 1B is a sectional view along line B-B in FIG. 1A, FIG. 1C is a view in a direction of arrow C in FIG. 1A, FIG. 1D is a view in a direction of arrow D in FIG. 1A, and FIG. 1E is a sectional view along line E-E in FIG. 1C.

DETAILED DESCRIPTION OF THE INVENTION

FIGS. 1A to 1E are drawings for explaining an intake device of a multicylinder engine according to an embodiment of the present invention. In the embodiment, the intake device of a vertical four-cylinder spark-ignition engine will be described.

As shown in FIGS. 1A, 1C, 1D, and 1E, the intake device includes an intake manifold (1) and a blow-by gas inlet portion (2) provided to the intake manifold (1).

As shown in FIGS. 1A and 1C, the intake manifold (1) includes a collector portion (3) extending in a front-rear direction, an intake air introducing portion (4) disposed at a center in the front-rear direction of the collector portion (3), and branch portions (7), (7) led out from front and rear end portions (5) and (6) of the collector portion (3), and the branch portions (7) are connected to intake ports (outside the drawings) of a cylinder head (outside the drawings).

The collector portion (3) includes the intake air introducing portion (4) and circular pipe portions (14) led out forward and rearward from the intake air introducing portion (4).

The branch portions (7) include branching each of led-out ends of the front and rear end portions (5) and (6) of the collector portion (3) into two.

As shown in FIGS. 1A, 1D, and 1E, a throttle body (8) is disposed at an upper portion of the intake air introducing portion (4). The throttle body (8) includes a butterfly-type throttle valve (9) in a throttle passage (8a) oriented in an up-down direction, and a valve shaft (10) of the throttle valve (9) is oriented in the front-rear direction.

As shown in FIG. 1E, the blow-by gas inlet portion (2) is provided to the intake air introducing portion (4) of the intake manifold (1) and the blow-by gas inlet portion (2) is provided on a side of a peripheral wall (8b) of the throttle passage (8a) to which a lower end portion (9a) of the half-open throttle valve (9) is directed and on a downstream side of the lower end portion (9a) of the throttle valve (9). The half-open throttle valve (9) is inclined and the fully-open throttle valve (9) is vertical.

The blow-by gas inlet portion (2) is a pipe pounded into the intake air introducing portion (4).

Although it is not shown in the drawing, blow-by gas is supplied into the blow-by gas inlet portion (2) from a breather chamber provided in a cylinder head cover through a blow-by gas passage.

Although it is not shown in the drawing, the throttle valve (9) is interlocked and coupled with a speed governing operation device with a governor interposed therebetween. As the speed governing operation device, there is a speed governing operation lever or a speed governing operation pedal.

As shown in FIG. 1E, the intake air introducing portion (4) includes an oil reservoir (11) at an inner bottom and the blow-by gas inlet portion (2) is directed toward the oil reservoir (11).

As shown in FIGS. 1C and 1D, the front and rear end portions (5) and (6) of the collector portion (3) are led out upward.

As shown in FIGS. 1D and 1E, an upper face (4a) of the intake air introducing portion (4) is formed at a lower position than central axes (7b) of outlet openings (7a) of the branch portions (7) and the throttle body (8) is mounted to the upper face (4a) of the intake air introducing portion (4).

As shown in FIG. 1E, an inner bottom face (11a) of the oil reservoir (11) is at a lower position than an inner bottom faces (14a) of the front and rear circular pipe portions (14) of the collector portion (3) adjacent to the intake air introducing portion (4).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An intake device of a vertical multi-cylinder engine, connectable to an intake port of a cylinder head of the engine, the intake device comprising:
   an intake manifold having:
      a collector portion extending in a front-to-rear direction, and having a front end and a back end,
      an intake air introducing portion disposed centrally in the front-to-rear direction of the collector portion, and
      a first branch portion extending from the front end of the collector portion and a second branch portion extending from the back end of the collector portion, the first and second branch portions being configured to connect to the intake port,
   a throttle body located at an upper portion of the intake air introducing portion, the throttle body having a throttle passage oriented in an up-down direction,
   a butterfly-type throttle valve located in the throttle passage for throttling an air intake stream downward, the throttle valve being pivotable about a valve shaft attached to the throttle passage and oriented in the front-to-rear direction, and
   a blow-by gas inlet portion disposed on a downstream side of the air intake stream and downstream from the throttle valve, in a peripheral wall of the throttle passage on a side toward which the lower end portion of the throttle valve is directed when in a half-open position.

2. The intake device of the vertical multicylinder engine according to claim 1, wherein the intake air introducing portion has an oil reservoir at the inner bottom and the blow-by gas inlet portion is directed toward the oil reservoir.

3. The intake device of the vertical multicylinder engine according to claim 1, wherein the front and rear end portions of the collector portion are led out upward.

4. The intake device of the vertical multicylinder engine according to claim 3, wherein an upper face of the intake air introducing portion is formed at a lower position than central axes of outlet openings of the branch portions and the throttle body is mounted to the upper face of the intake air introducing portion.

* * * * *